United States Patent
Kramer

(10) Patent No.: US 11,725,823 B2
(45) Date of Patent: *Aug. 15, 2023

(54) MOUNTING A CERAMIC COMPONENT TO A NON-CERAMIC COMPONENT IN A GAS TURBINE ENGINE

(71) Applicant: Raytheon Technologies Corporation, Farmington, CT (US)

(72) Inventor: Stephen K. Kramer, Cromwell, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/567,533

(22) Filed: Jan. 3, 2022

(65) Prior Publication Data

US 2022/0275942 A1  Sep. 1, 2022

Related U.S. Application Data

(63) Continuation of application No. 16/591,841, filed on Oct. 3, 2019, now Pat. No. 11,215,367.

(51) Int. Cl.
*F23R 3/60* (2006.01)
*F23R 3/00* (2006.01)

(52) U.S. Cl.
CPC .............. *F23R 3/60* (2013.01); *F23R 3/007* (2013.01); *F05D 2240/35* (2013.01)

(58) Field of Classification Search
CPC .............. F01D 11/005; F05D 2240/11; F05D 2240/15; F23M 5/04; F23R 3/002; F23R 3/007; F23R 3/42; F23R 3/50; F23R 3/60; F23R 2900/00012; F23R 2900/00017

See application file for complete search history.

(56) References Cited

U.S. PATENT DOCUMENTS

| | | |
|---|---|---|
| 4,380,896 A | 4/1983 | Wiebe |
| 5,609,031 A | 3/1997 | Jones |
| 8,434,313 B2 | 5/2013 | Tschuor |
| 9,423,129 B2 | 8/2016 | Graves |
| 9,423,130 B2 | 8/2016 | Prociw |
| 11,215,367 B2 * | 1/2022 | Kramer ............ F23R 3/60 |

(Continued)

FOREIGN PATENT DOCUMENTS

| | | |
|---|---|---|
| DE | 102017206502 A1 | 10/2018 |
| EP | 0706009 A3 | 1/1997 |

(Continued)

OTHER PUBLICATIONS

English translation of DE102017206502 (Year: 2018).*

*Primary Examiner* — Scott J Walthour
(74) *Attorney, Agent, or Firm* — Getz Balich LLC

(57) ABSTRACT

A combustor with a centerline is provided that includes a support structure and a heat shield. The heat shield extends circumferentially about and axially along the centerline. The heat shield is configured from or otherwise includes ceramic material. The heat shield is mounted to the support structure by an interlocking joint connection. The interlocking joint connection includes a projection and a groove. The projection is configured with the support structure and includes a plurality of fingers arranged along and projecting into the groove. The groove is formed in the heat shield.

17 Claims, 21 Drawing Sheets

(56) References Cited

U.S. PATENT DOCUMENTS

| | | |
|---|---|---|
| 2002/0184889 A1 | 12/2002 | Calvez |
| 2006/0176671 A1 | 8/2006 | Heilos |
| 2015/0330633 A1 | 11/2015 | Graves |
| 2016/0215980 A1 | 7/2016 | Chang |
| 2016/0252248 A1 | 9/2016 | Ruberte Sanchez |
| 2016/0258624 A1* | 9/2016 | Harding .................. F23M 5/04 |
| 2018/0299133 A1 | 10/2018 | Kramer |
| 2019/0264923 A1 | 8/2019 | Kobayashi |
| 2020/0158341 A1 | 5/2020 | Bloom |

FOREIGN PATENT DOCUMENTS

| | | |
|---|---|---|
| EP | 2180256 A2 | 4/2010 |
| EP | 3056813 A1 | 8/2016 |
| EP | 3115690 A1 | 1/2017 |
| EP | 3054218 B1 | 3/2019 |
| GB | 2432902 B | 1/2011 |

\* cited by examiner

MOUNTING A CERAMIC COMPONENT TO A NON-CERAMIC COMPONENT IN A GAS TURBINE ENGINE

CROSS-REFERENCE TO RELATED APPLICATIONS

This application is a continuation of and claims priority to U.S. patent application Ser. No. 16/591,841 filed Oct. 3, 2019, which is hereby incorporated herein by reference in its entirety.

BACKGROUND OF THE DISCLOSURE

1. Technical Field

This disclosure relates generally to a gas turbine engine and, more particularly, to an assembly for mounting a ceramic component to a non-ceramic component within a gas turbine engine.

2. Background Information

Certain developments in gas turbine engine technology have led to increased internal gas temperatures within the engine. To accommodate these increased internal gas temperatures, gas turbine engine components such as gas path liners may be air cooled and/or constructed from high temperature materials. For example, a gas path liner may be constructed from a ceramic matrix composite (CMC) material. A typical CMC material, however, may have very different properties (e.g., a coefficient of thermal expansion) than other typical gas turbine engine materials such as metal. Special compliant connections therefore are provided in order to mount a CMC component to a metal component to allow, for example, thermally induced movement between those components. While various such compliant connections are known in the art, there is still room for improvement. There is a need in the art therefore for improved mounts between a ceramic (e.g., CMC) component and a non-ceramic (e.g., metal) component.

SUMMARY OF THE DISCLOSURE

According to an aspect of the present disclosure, a combustor with a centerline is provided. This combustor includes a support structure and a heat shield. The heat shield extends circumferentially about and axially along the centerline. The heat shield is configured from or otherwise includes ceramic material. The heat shield is mounted to the support structure by an interlocking joint connection. The interlocking joint connection includes a projection and a groove. The projection is configured with the support structure. The projection includes a plurality of fingers arranged along and projecting into the groove. The groove is formed in the heat shield.

According to another aspect of the present disclosure, an assembly is provided for a gas turbine engine. This assembly includes a support structure and a turbine engine component. The turbine engine component extends circumferentially about and axially along a centerline. The turbine engine component is configured from or otherwise includes ceramic matrix composite material. The turbine engine component is mounted to the support structure by a connection. The connection includes a plurality of protrusions and a groove. The plurality of protrusions arranged circumferentially about the centerline. The plurality of projections extend axially into the groove. The groove is formed within the turbine engine component at an axial end of the turbine engine component.

According to still another aspect of the present disclosure, another assembly is provided for a gas turbine engine. This assembly includes a support structure and a turbine engine component. The turbine engine component extends circumferentially about and axially along a centerline. The turbine engine component is configured from or otherwise includes ceramic matrix composite material. The turbine engine component is configured with a groove, an inner groove side surface and an outer groove side surface. The turbine engine component is mounted to the support structure by a connection. The connection includes the groove and the projection. The projection is configured with the support structure and projects axially along the centerline into the groove. A first portion of the projection is engaged with the inner groove side surface and disengaged from the outer groove side surface. A second portion of the projection is engaged with the outer groove side surface and disengaged from the inner groove side surface.

The first portion of the projection may be axially aligned with the second portion of the projection along the centerline. In addition or alternatively, the first portion of the projection may be circumferentially aligned with the second portion of the projection about the centerline.

The groove may be formed within the turbine engine component radially between a groove first side surface and a groove second side surface. A first of the plurality of protrusions may contact and be biased radially against the groove first side surface. A second of the plurality of protrusions may contact and be biased radially against the groove second side surface.

The turbine engine component may be configured as or otherwise include a heat shield panel.

The groove may be formed within the heat shield radially between a groove first side surface and a groove second side surface. The plurality of fingers may include a first finger configured with a first portion and a second portion. The first portion may radially engage the groove first side surface and may be spaced from the groove second side surface. The second portion may radially engage the groove second side surface and may be spaced from the groove first side surface.

The first portion may be biased radially against groove first side surface. The second portion may be biased radially against groove second side surface.

The first portion may overlap the second portion.

A groove end surface may extend radially between the groove first side surface and the groove second side surface. The second portion may be between the first portion and the groove end surface.

The first finger may be further configured with a third portion that radially engages the groove first side surface or the groove second side surface.

The combustor may be configured to direct cooling air to a portion of the projection within the groove.

The projection may be configured from or otherwise include metal.

A heat shield mount may be included, which heat shield mount may include the projection. The heat shield mount may be configured as a monolithic full hoop body.

A heat shield mount may be included, which heat shield mount may include the projection and a mount base. The projection may project axially out from the mount base and into the groove.

A combustor bulkhead and a combustor hood may be included. The combustor hood, the combustor bulkhead, the heat shield mount and the support structure may be arranged together in a stack and connected together by a fastener that projects radially through the stack.

A heat shield mount may be included, which heat shield mount may include the projection and a mount base. The heat shield mount may be configured with a mount groove extending radially between the projection and the mount base. The support structure and the heat shield may project axially into the mount groove.

The heat shield mount may be attached to the support structure by a fastener extending radially through a slot formed in the mount base.

The heat shield may extend axially along the centerline between an upstream end and a downstream end. The interlocking joint connection may be located at the upstream end or the downstream end.

The heat shield may include a plurality of heat shield panels arranged circumferentially about the centerline. The groove may be configured with a first of the plurality of the heat shield panels.

The support structure may include a shell extending circumferentially about and axially along the centerline. A cooling cavity may be formed by and may extend radially between the shell and the heat shield.

The heat shield may be configured with a plurality of apertures extending radially through the heat shield.

A locating feature may be included and configured to circumferentially and/or axially locate the heat shield relative to the support structure. The locating feature may be configured as or otherwise include a tubular body that forms a quench aperture.

The present disclosure may include one or more of the features mentioned herein alone or in any combination.

The foregoing features and the operation of the invention will become more apparent in light of the following description and the accompanying drawings.

DETAILED DESCRIPTION

Figure 1:
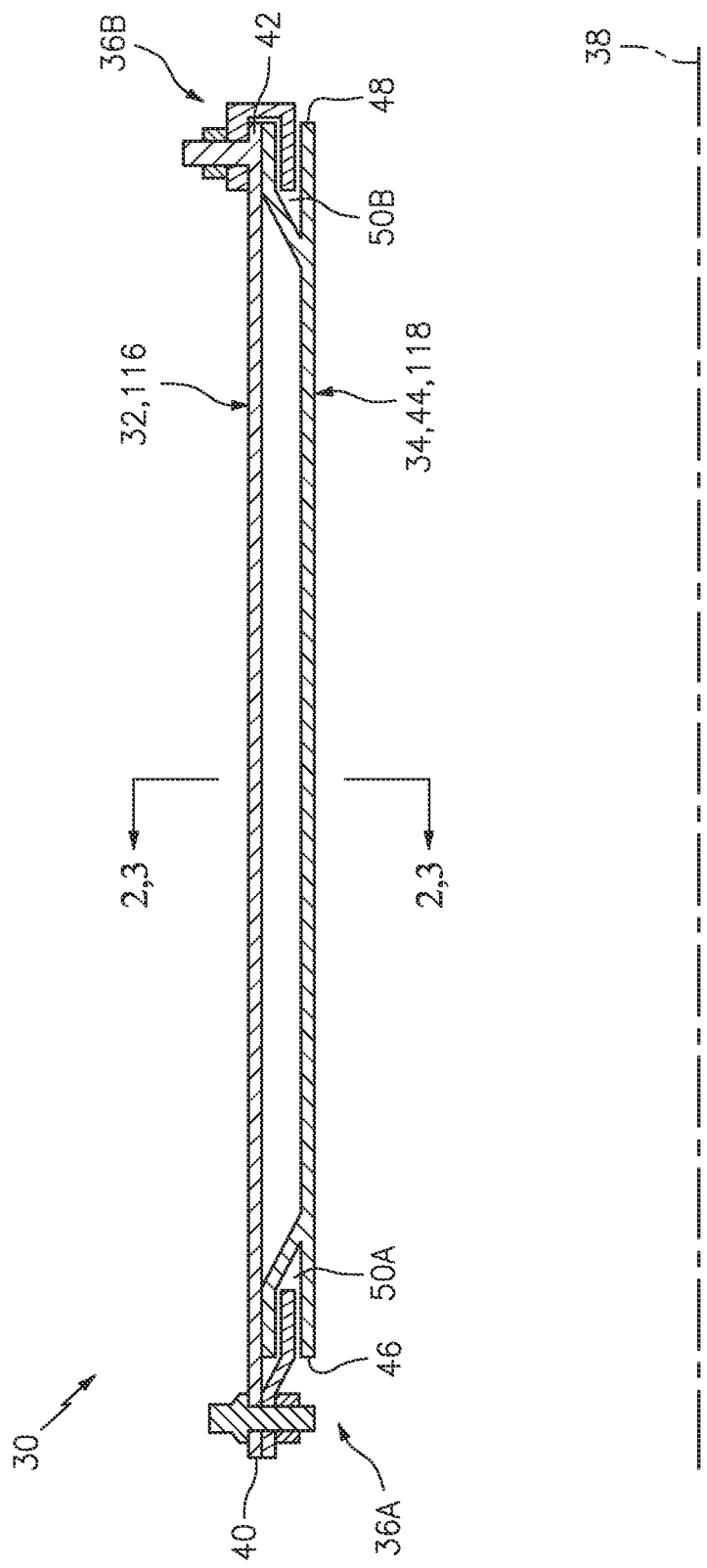
FIG. 1 is a partial side sectional illustration of an assembly for a gas turbine engine.

FIG. 1 illustrates an assembly 30 for a gas turbine engine. This turbine engine assembly 30 includes a stationary support structure 32 and a turbine engine component 34 such as, but not limited to, a gas path liner (e.g., a combustor heat shield) or any other component exposed to hot gases within the gas turbine engine. The turbine engine component 34 is connected (e.g., mounted) to the support structure 32 by one or more connections; e.g., a first (e.g., forward/upstream) connection 36A and/or a second (e.g., aft/downstream) connection 36B.

Figure 2:
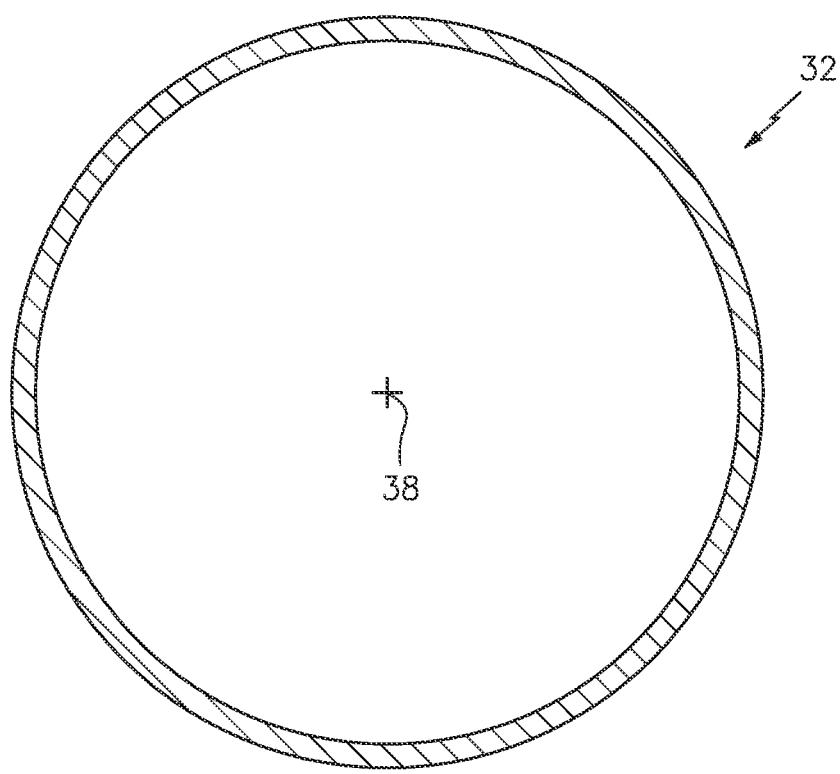
FIG. 2 is a cross-sectional illustration of a support structure for the turbine engine assembly taken along line 2-2 in FIG. 1.

The support structure 32 of FIG. 2 extends circumferentially about (e.g., completely around) a centerline 38 of the assembly 30; e.g., a rotational axis of the gas turbine engine. This support structure 32 may be configured as a monolithic full hoop body. Referring to FIG. 1, the support structure 32 extends axially along the centerline 38 between a first (e.g., forward/upstream) end 40 and a second (e.g., aft/downstream) end 42. The support structure 32 may be constructed from or otherwise include a non-ceramic material such as, but not limited to, metal. Examples of such metal include, but are not limited to, cobalt alloys, such as Haynes 25 and Haynes 188, and nickel alloys such as Inconel 625.

Figure 3:
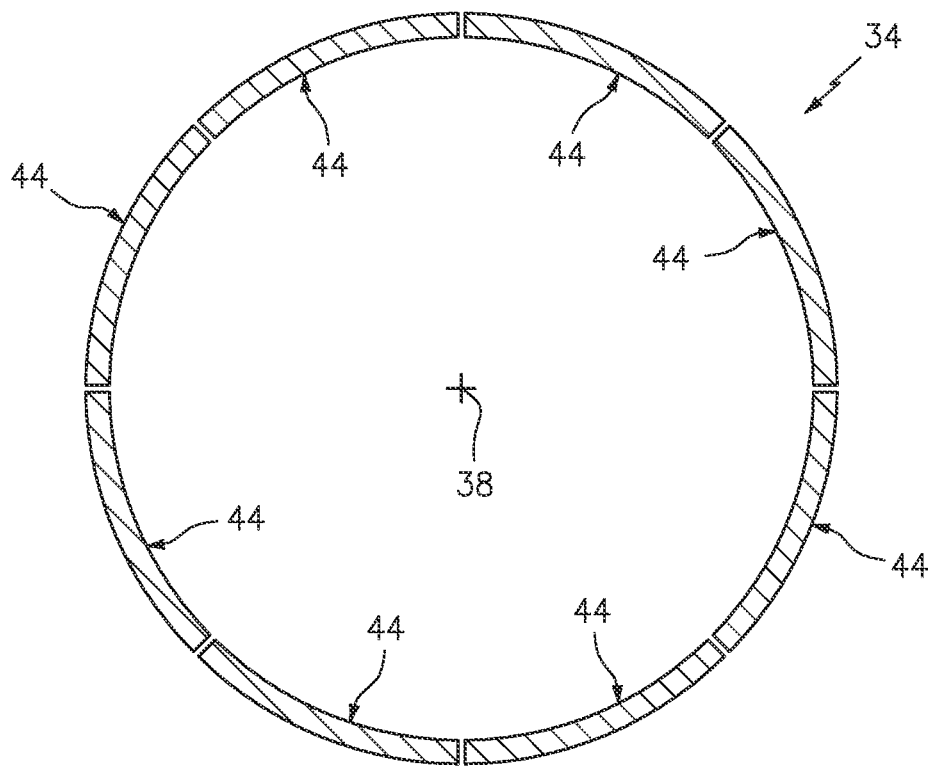
FIG. 3 is a cross-sectional illustration of a component for the turbine engine assembly taken along line 3-3 in FIG. 1.

The turbine engine component 34 of FIG. 3 extends circumferentially about (e.g., completely around) the centerline 38. This turbine engine component 34 may be configured as a monolithic full hoop body. Alternatively, as shown in FIG. 3, the turbine engine component 34 may be configured from a plurality of turbine engine component segments 44; e.g., heat shield/liner panels. Each of these component segments 44 may be configured as a monolithic (e.g., arcuate) body. The component segments 44 of FIG. 3 are arranged circumferentially about the centerline 38 in an annular array. Each of the component segments 44 in this array is disposed circumferentially between two respective circumferentially adjacent neighboring component segments 44. Referring to FIG. 1, the turbine engine component 34 and each of its component segments 44 extend axially along the centerline 38 between a first (e.g., forward/upstream) end 46 and a second (e.g., aft/downstream) end 48. The turbine engine component 34 and each of its component segments 44 may be constructed from or otherwise include a ceramic material such as, but not limited to, a ceramic matrix composite (CMC) material. Examples of such a CMC material include, but are not limited to, SiC/SiC, or oxide/oxide.

Figure 4:
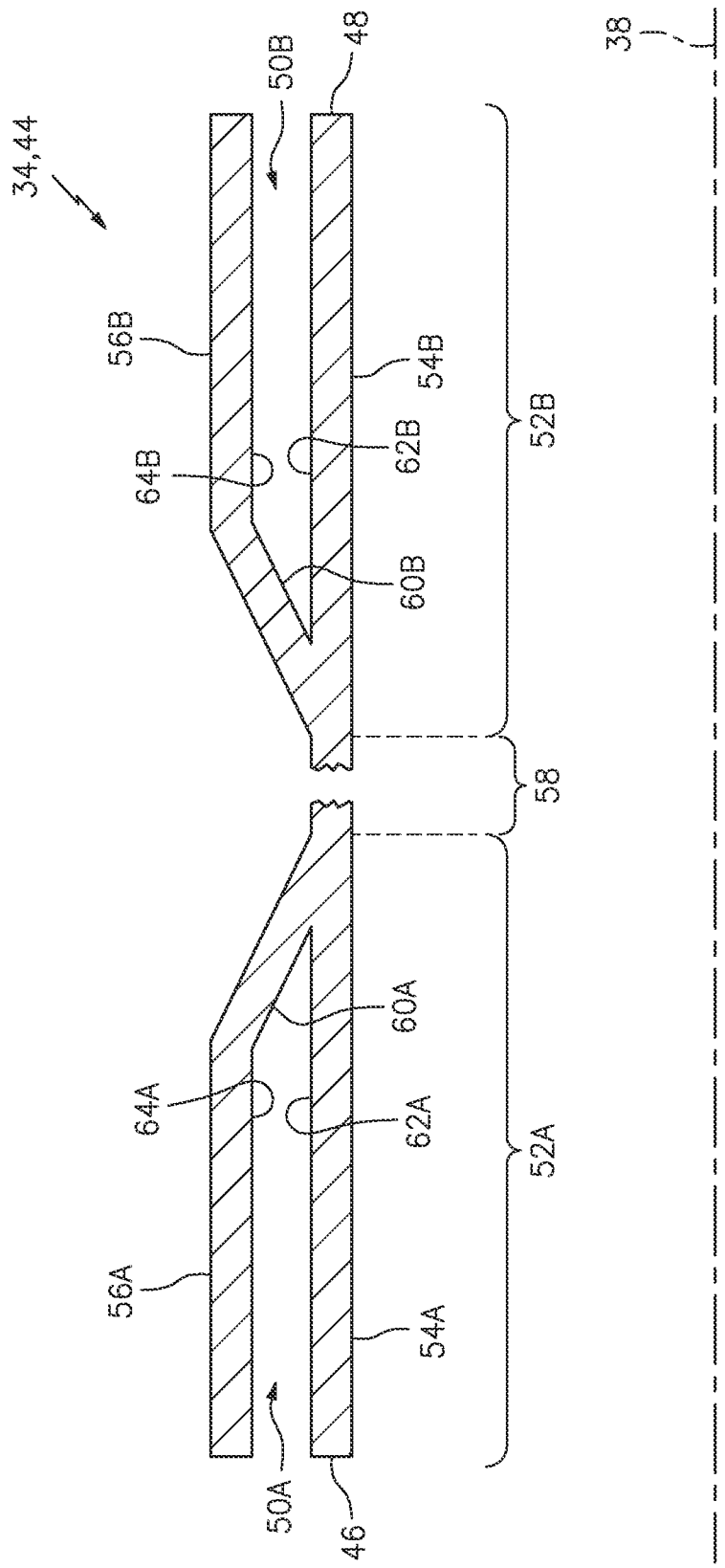
FIG. 4 is a partial side sectional illustration of the turbine engine component.

Referring to FIG. 4, each of the component segments 44 is configured with one or more grooves. The component segment 44 of FIG. 4, for example, includes a first (e.g., forward/upstream) groove 50A located at (e.g., on, adjacent or proximate) the forward end 46. The component segment of FIG. 4 further includes a second (e.g., aft/downstream) groove 50B located at the second end 48.

Figure 5:
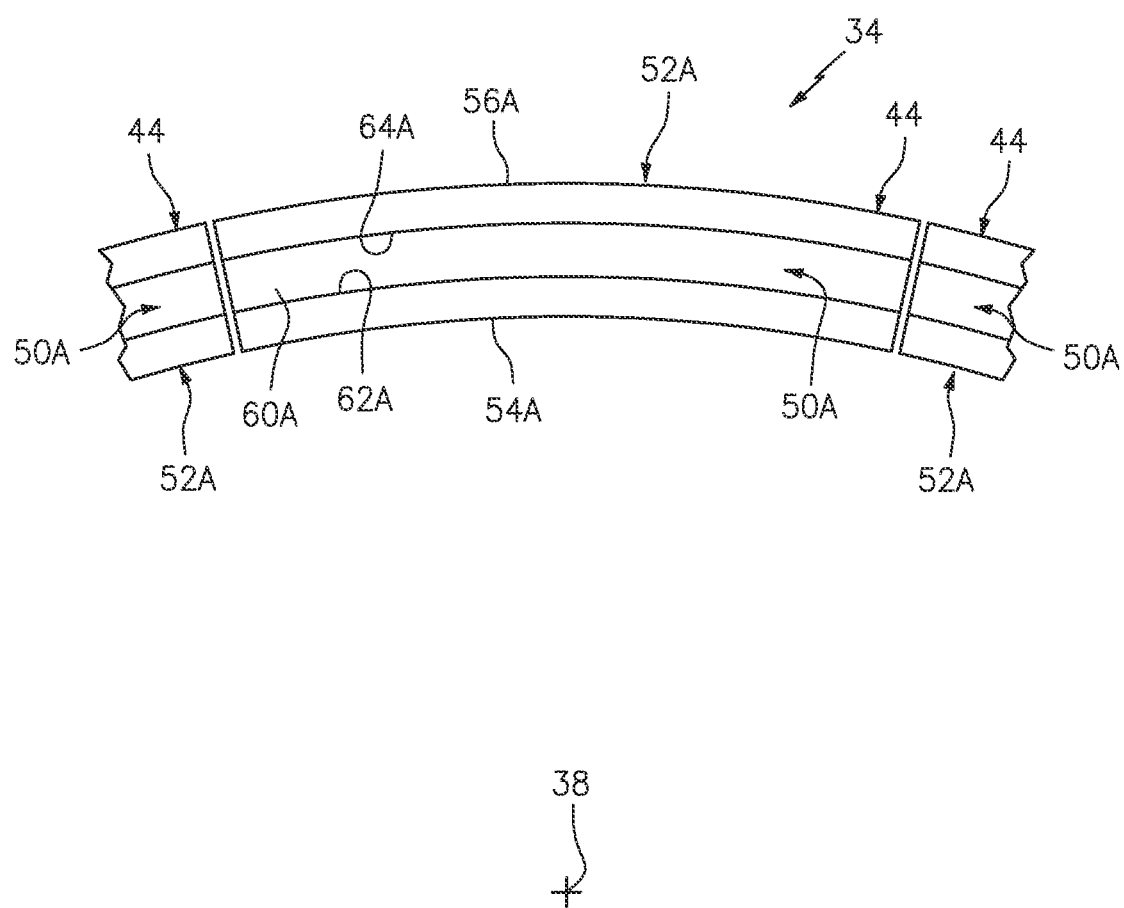
FIG. 5 is a partial first end view illustration of the turbine engine component.

The first groove 50A of FIG. 4 is formed by a first Y-flange 52A at the first end 46. This first Y-flange 52A includes a first inner flange 54A and a first outer flange 56A, where each flange 54A and 56A projects axially out from a base 58 of the respective component segment 44 to the first end 46. The first groove 50A extends axially into the first Y-flange 52A from the first end 46 to a first groove end surface 60A. The first groove 50A extends radially between a first inner groove side surface 62A and a first outer groove side surface 64A, where the first groove end surface 60A extends radially between interior edges of the side surfaces 62A and 64A. The first inner groove side surface 62A may be carried/defined by the first inner flange 54A. The first outer groove side surface 64A may be carried/defined by the first outer flange 56A. The first groove 50A of FIG. 5 extends circumferentially about the centerline 38 and through the component segment 44 and its first Y-flange 52A. However, in other embodiments, the first groove 50A may extend circumferentially within or partially into the component segment 44 and its first Y-flange 52A.

Figure 6:
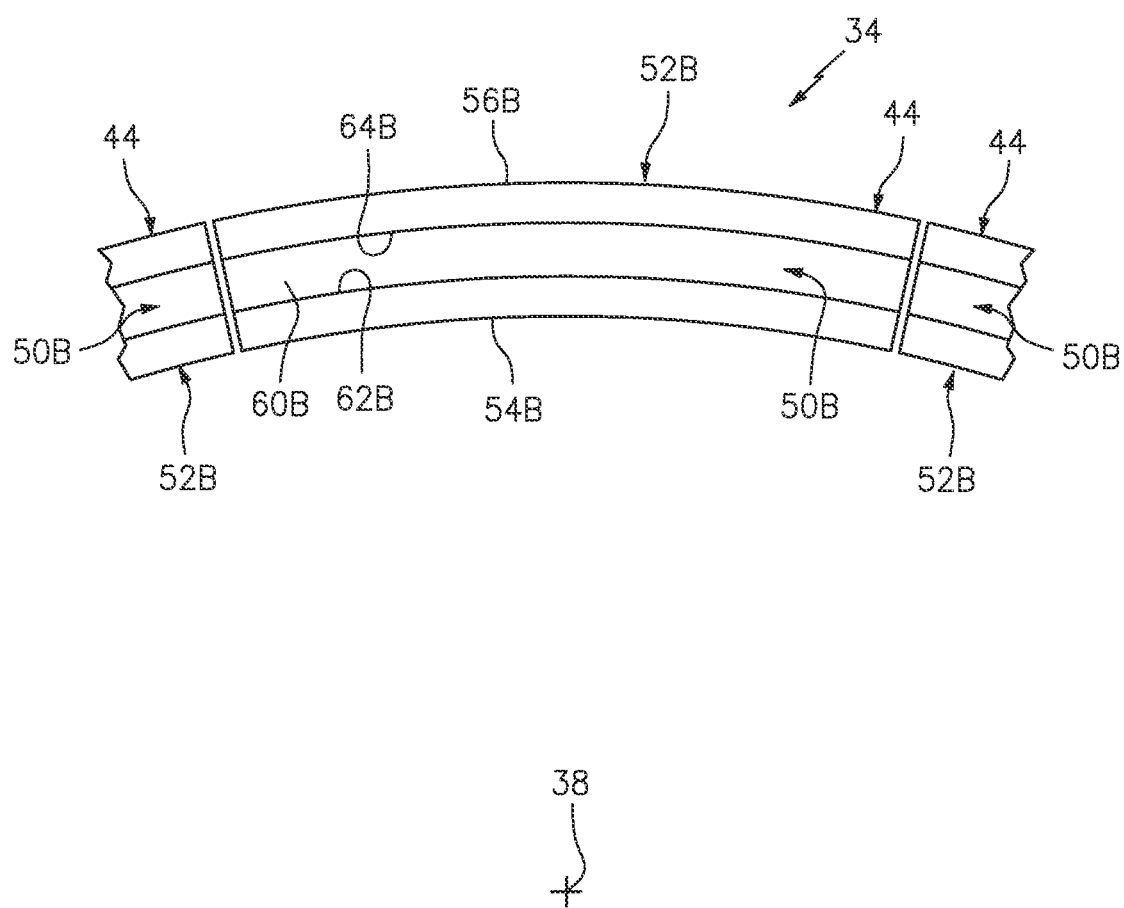
FIG. 6 is a partial second end view illustration of the turbine engine component.

The second groove 50B of FIG. 4 is formed by a second Y-flange 52B at the second end 48. This second Y-flange 52B includes a second inner flange 54B and a second outer flange 56B, where each flange 54B and 56B projects axially out from the component segment base 58 to the second end 48. The second groove 50B extends axially into the second Y-flange 52B from the second end 48 to a second groove end surface 60B. The second groove 50B extends radially between a second inner groove side surface 62B and a second outer groove side surface 64B, where the second groove end surface 60B extends radially between interior edges of the side surfaces 62B and 64B. The second inner groove side surface 62B may be carried/defined by the second inner flange 54B. The second outer groove side surface 64B may be carried/defined by the second outer flange 56B. The second groove 50B of FIG. 6 extends circumferentially about the centerline 38 and through the component segment 44 and its second Y-flange 52B. However, in other embodiments, the second groove 50B may extend circumferentially within or partially into the component segment 44 and its second Y-flange 52B.

Figure 7:
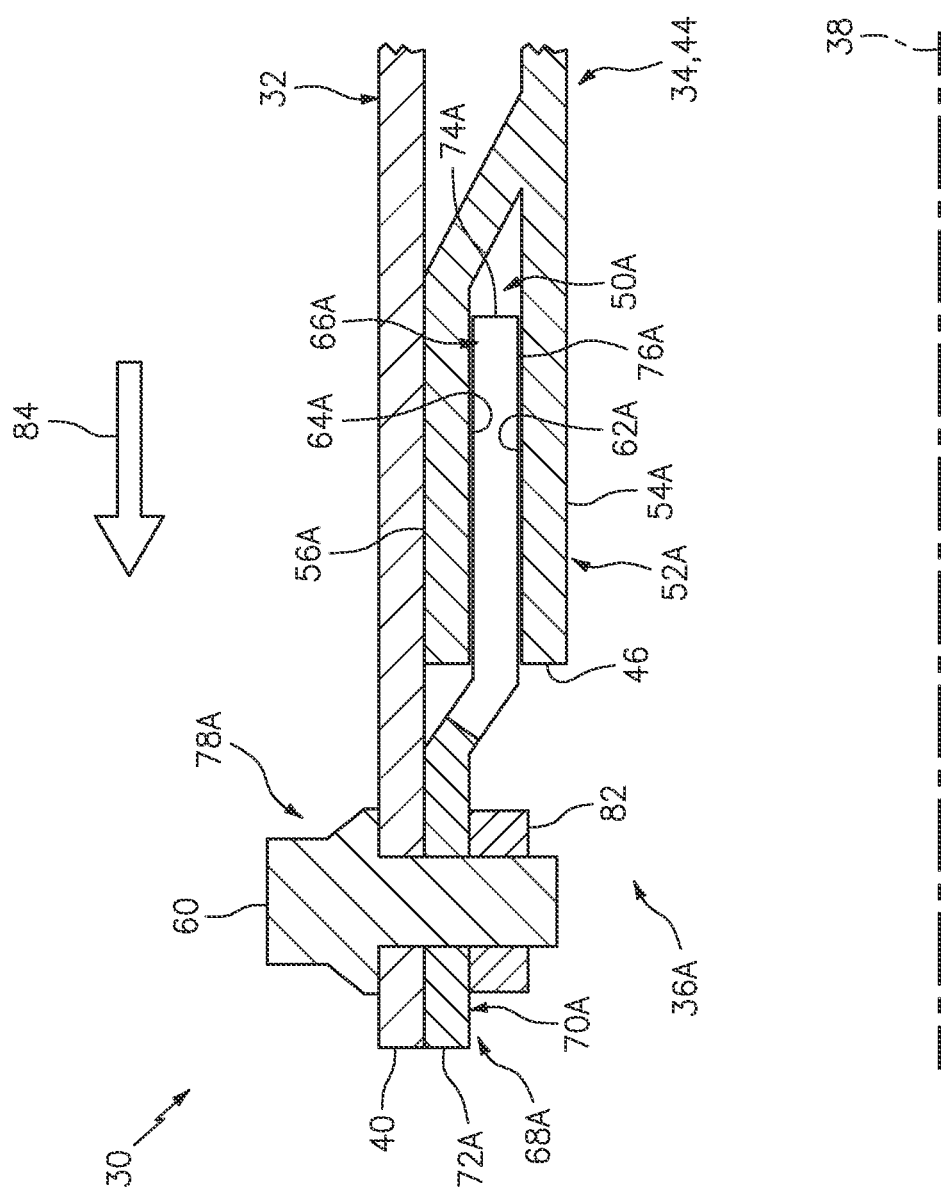
FIG. 7 is a partial side sectional illustration of a first connection between the turbine engine component and the support structure.

Referring to FIG. 7, the first connection 36A is configured to secure at least a first (e.g., forward/upstream) end portion of the turbine engine component 34 with the support structure 32. More particularly, the first connection 36A of FIG. 7 is configured to secure first end portion(s) of one or more or each of the component segments 44 with the support structure 32.

The first connection 36A may be configured as an interlocking joint connection such as, but not limited to, a rim seal connection, a keyed connection, a tongue-and-groove connection, etc. The first connection 36A of FIG. 7, for example, includes a first projection 66A (e.g., a rim or a flange) and one or more or each of the first grooves 50A.

Figure 8:
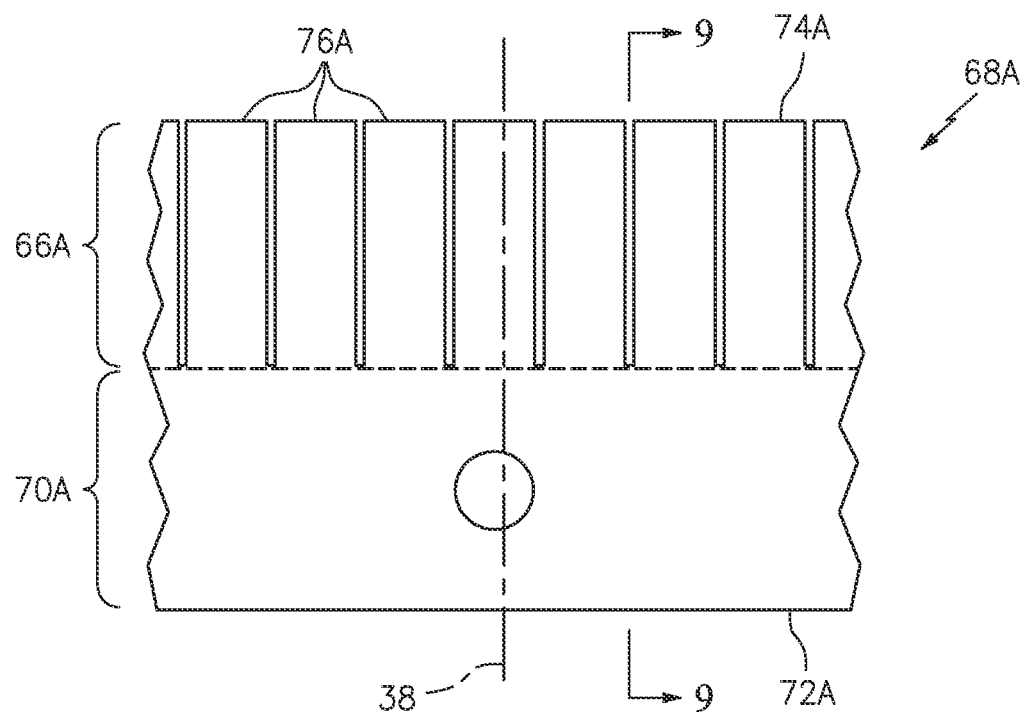
FIG. 8 is a partial side view illustration of a first component mount.

Referring to FIG. 8, the first projection 66A is configured as part of a first component (e.g., heat shield) mount 68A. This first component mount 68A of FIG. 8 extends circumferentially about (e.g., completely around) the centerline 38. The first component mount 68A may be configured as a monolithic full hoop body. However, in other embodiments, the first component mount 68A may be configured from a plurality of (e.g., arcuate) first component mount segments arranged, for example, in an annular array.

The first component mount 68A may be constructed from or otherwise include metal. Examples of such metal include, but are not limited to, a high temperature cobalt alloy such as, but not limited to, Haynes 25 and Haynes 188.

Figure 9:
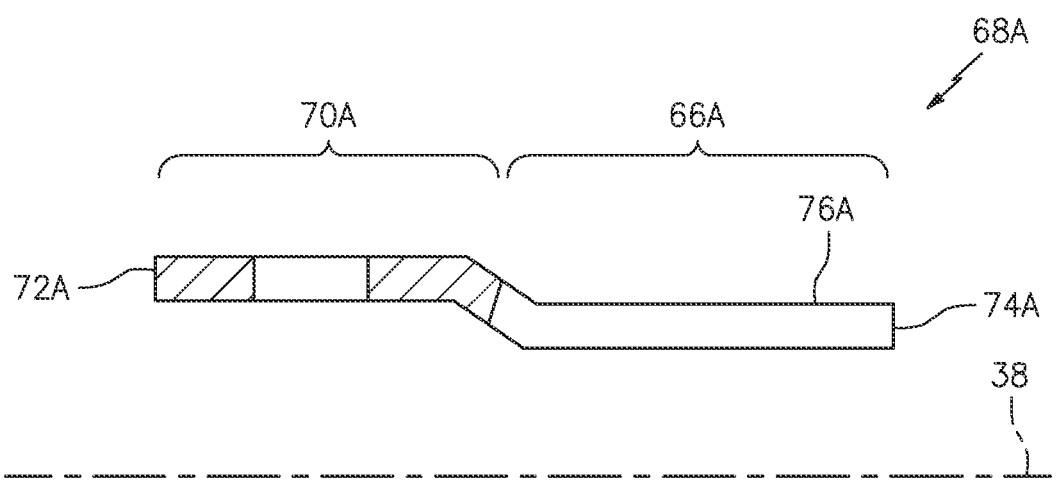
FIG. 9 is a partial side sectional illustration of the first component mount taken along line 9-9 in FIG. 8.

The first component mount 68A of FIG. 8 includes the first projection 66A and a first mount base 70A. This first mount base 70A extends circumferentially about (e.g., completely around) the centerline 38. Referring to FIG. 9, the first mount base 70A extends axially along the centerline 38 from a first (e.g., forward/upstream) end 72A of the first component mount 68A to the first projection 66A. The first projection 66A extends axially along the centerline 38 from the first mount base 70A to a second (e.g., aft/downstream) end 74A of the first component mount 68A.

The first projection 66A includes a plurality of first protrusions 76A; e.g., fingers. Referring to FIG. 8, the first protrusions 76A are arranged circumferentially about the centerline 38 in, for example, an annular array. Referring to FIG. 9, each of the first protrusions 76A projects axially along the centerline 38 out from, for example, the first mount base 70A to the second end 74A of the first component mount 68A. Each first protrusion 76A is circumferentially separated from a circumferentially adjacent neighboring first protrusion 76A by a first slot. Each of the first protrusions 76A may be configured as a compliant/spring finger. With such a configuration, each of the first protrusions 76A is adapted to flex/bend radially up-and-down independent of the other first protrusions 76A.

Referring to FIG. 7, the first component mount 68A is located at the first end 40 of the support structure 32. The first mount base 70A is connected (e.g., mounted) to the support structure 32 by one or more fasteners 78A; e.g., sets of bolts 80 and nuts 82. The first mount base 70A, of course, may also or alternatively be connected to the support structure 32 by one or more other fastening and/or bonding techniques. Still alternatively, the first mount base 70A may be configured as an integral portion of the support structure 32.

The turbine engine component 34 and, more particularly, each of its component segments 44 may be translated axially along the centerline 38 in a forward direction (see arrow 84) to mate each of the first Y-flanges 52A with the first projection 66A. More particular, the first projection 66A is arranged with the first Y-flanges 52A such that each of the first protrusions 76A projects axially along the centerline 38 into a respective one of the first grooves 50A. Thus, each first groove 50A receives one or more of the first protrusions 76A. The first protrusions 76A and the first grooves 50A thereby form the first (e.g., interlocking joint) connection 36A between the turbine engine component 34 and the support structure 32.

Figure 10:
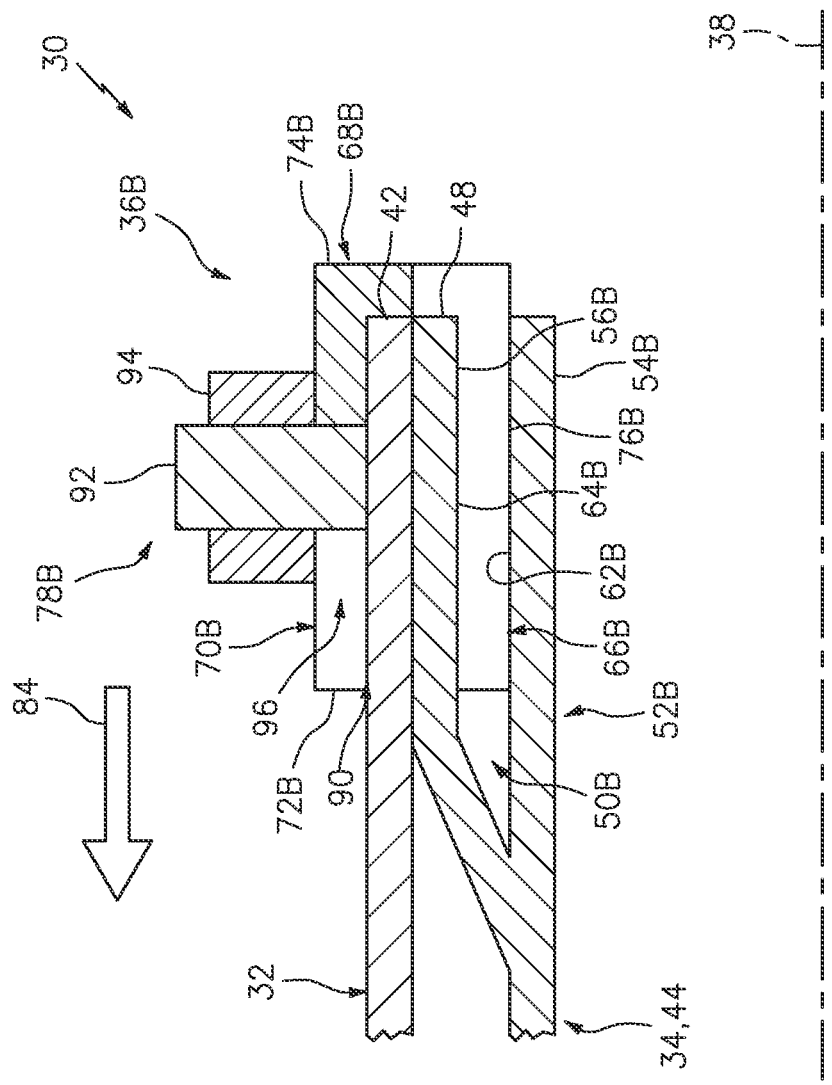
FIG. 10 is a partial side sectional illustration of a second connection between the turbine engine component and the support structure.

Referring to FIG. 10, the second connection 36B is configured to secure at least a second (e.g., aft/downstream) end portion of the turbine engine component 34 with the support structure 32. More particularly, the second connection 36B of FIG. 10 is configured to secure second end portion(s) of one or more or each of the component segments 44 with the support structure 32.

The second connection 36B may be configured as an interlocking joint connection such as, but not limited to, a rim seal connection, a keyed connection, a tongue-and-groove connection, etc. The second connection 36B of FIG. 10, for example, includes a second projection 66B (e.g., a rim or a flange) and one or more or each of the second grooves 50A.

Figure 11A:
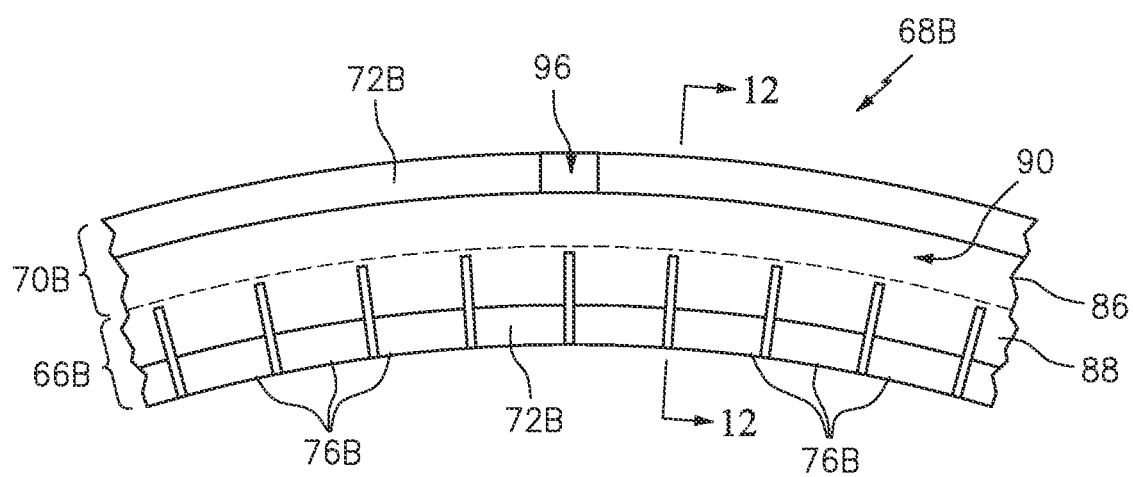
FIG. 11A is a partial first end view illustration of a second component mount.
Figure 11B:
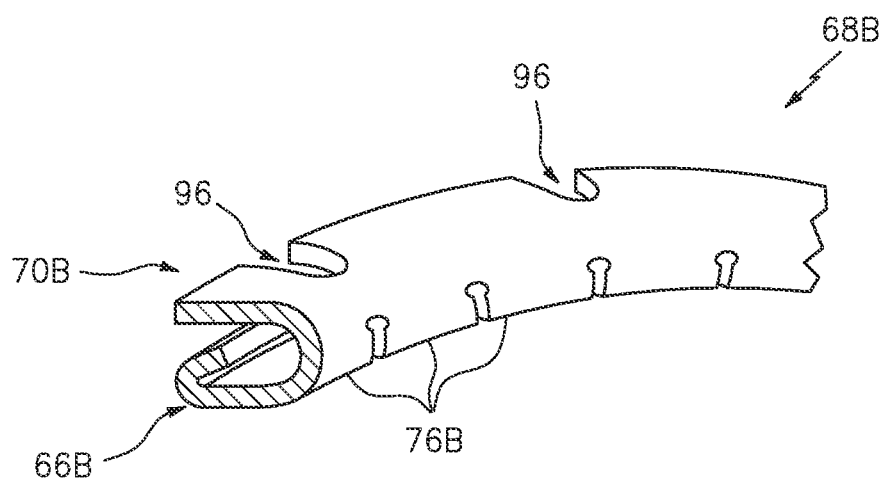
FIG. 11B is a partial perspective illustration of the second component mount.

Referring to FIGS. 11A and 11B, the second projection 66B is configured as part of a second component (e.g., heat shield) mount 68B. This second component mount 68B of FIGS. 11A and 11B extends circumferentially about (e.g., completely around) the centerline 38. The second component mount 68B may be configured as a monolithic full hoop body. However, in other embodiments, the second component mount 68B may be configured from a plurality of (e.g., arcuate) second component mount segments arranged, for example, in an annular array.

The second component mount 68B may be constructed from or otherwise include metal. Examples of such metal include, but are not limited to, a high temperature cobalt alloy such as, but not limited to, Haynes 25 and Haynes 188.

Figure 12:
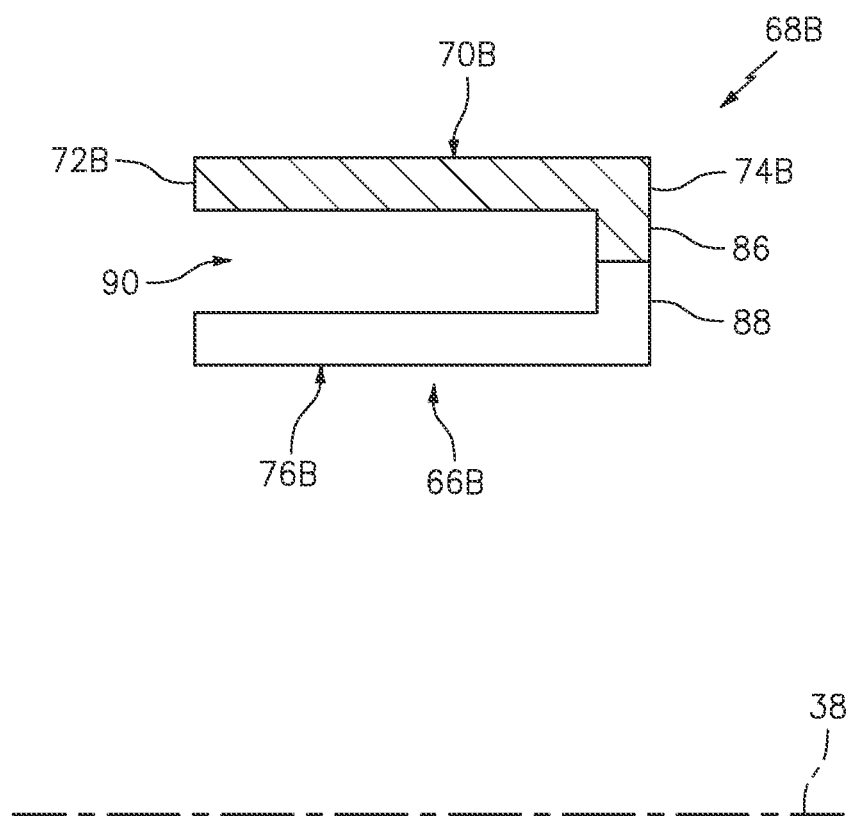
FIG. 12 is a partial side sectional illustration of the second component mount taken along line 12-12 in FIG. 11A.

The second component mount 68B of FIG. 11A includes the second projection 66B and a second mount base 70B. This second mount base 70B extends circumferentially about (e.g., completely around) the centerline 38. Referring to FIG. 12, the second mount base 70B extends axially along the centerline 38 from or about a first (e.g., forward/upstream) end 72B of the second component mount 68B to the second projection 66B. The second projection 66B extends axially along the centerline 38 from the second mount base 70B to or about the first end 72B of the second component mount 68B. The second projection 66B thereby axially overlaps (e.g., is bent/folded back relative to) the second mount base 70B. Where the turbine engine component 34 is arranged radially within the support structure 32 (e.g., see FIG. 10), the second projection 66B is radially within (e.g., circumscribed by) the second mount base 70B. Where the support structure 32 is arranged radially within the turbine engine component 34, the second mount base 70B is radially within (e.g., circumscribed by) the second projection 66B. The second projection 66B is connected to the second mount base 70B at a second (e.g., aft/downstream) end 74B of the second component mount 68B. For example, a radially inward (or outward) turned portion 86 of the second mount base 70B may extend radially inwards (or outwards) to a radially outward (or inward) turned portion 88 of the second projection 66B. With this configuration, the second component mount 68B is configured with a (e.g., annular) mount groove 90 formed by and radially between the second mount base 70B and the second projection 66B.

The second projection 66B includes a plurality of second protrusions 76B; e.g., fingers. Referring to FIG. 11A, the second protrusions 76B are arranged circumferentially about the centerline 38 in, for example, an annular array. Referring to FIG. 12, each of the second protrusions 76B projects out from, for example, the second mount base 70B and axially along the centerline 38 to or about the first end 72B of the second component mount 68B. Referring to FIG. 11A, each second protrusion 76B is circumferentially separated from a circumferentially adjacent neighboring second protrusion 76B by a second slot. Each of the second protrusions 76B may be configured as a compliant/spring finger. With such a configuration, each of the second protrusions 76B is adapted to flex/bend radially up-and-down independent of the other second protrusions 76B.

Referring to FIG. 10, the second component mount 68B may be translated along the centerline 38 in the forward direction (see the arrow 84) to mate the support structure 32 and the turbine engine component 34 and its component segments 44 with the mount groove 90. More particularly, a second end portion of the support structure 32 and one or more or each of the second outer flanges 56B is arranged within (e.g., projects axially into) the mount groove 90. With this arrangement, the second projection 66B is arranged with the second Y-flanges 52B such that each of the second protrusions 76B projects axially along the centerline 38 into a respective one of the second grooves 50A. Thus, each second groove 50B receives one or more of the second protrusions 76B. The second protrusions 76B and the second grooves 50B thereby form the second (e.g., interlocking joint) connection 36B between the turbine engine component 34 and the support structure 32. Furthermore, the second mount base 70B is connected (e.g., mounted) to the support structure 32 by one or more fasteners 78B; e.g., sets of studs 92 and nuts 94. In particular, each of the fasteners 78B (e.g., each stud 92) may be located within a respective slot 96 in the second mount base 70B as the second component mount 68B is axially translated. The second component mount 68B is thereby located at and secured to the second end 42 of the support structure 32. The second mount base 70B, of course, may also or alternatively be connected to the support structure 32 by one or more other fastening and/or bonding techniques.

Figure 13:
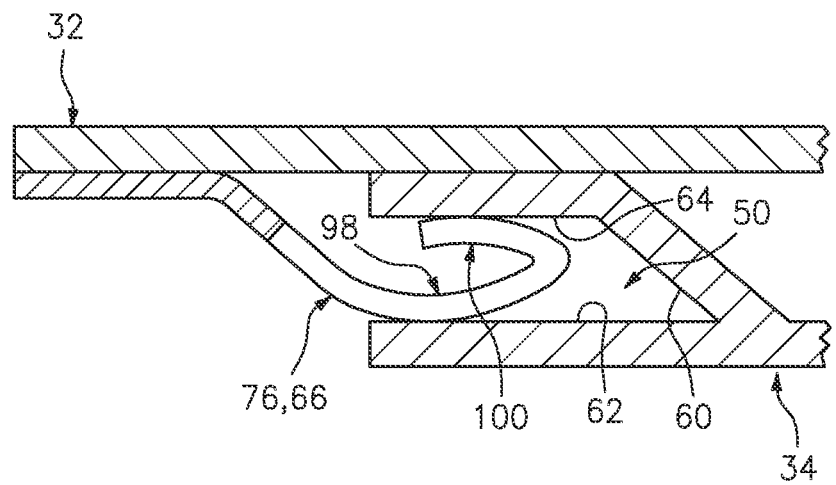
FIGS. 13-15 are partial side sectional illustrations of connections between the turbine engine component and the support structure with alternative component mounts.
Figure 14:
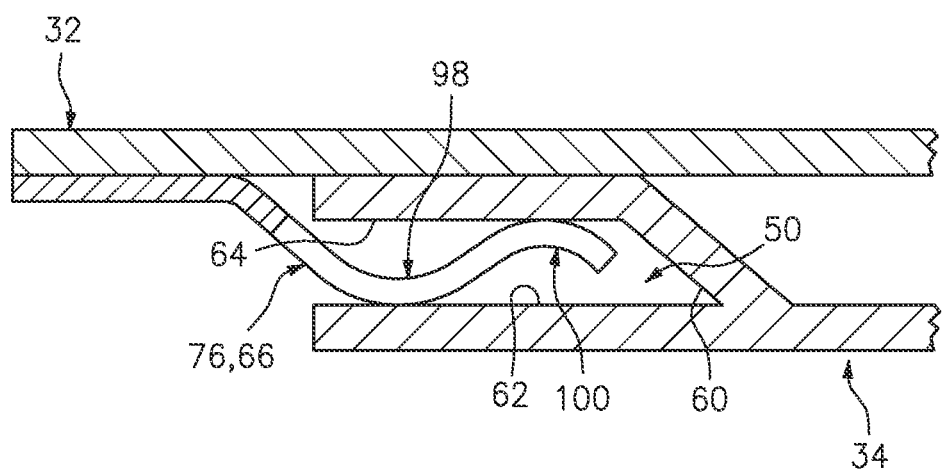
Figure 15:
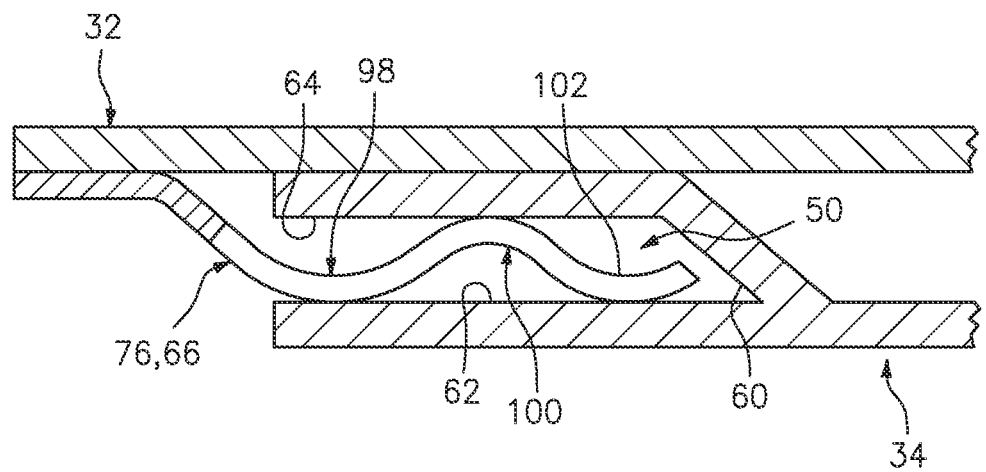

Referring to FIGS. 13-15, in some embodiments, each protrusion 76A, 76B (generally referred to as "76") may be configured to engage (e.g., radially contact) both side surfaces 62A, 62B (generally referred to as "62") and 64A, 64B (generally referred to as "64") of a respective groove 50A, 50B (generally referred to as "50"). The protrusion 76 of FIGS. 13-15, for example, includes a first portion 98 and a second portion 100. The first portion 98 radially engages and may be radially biased against one of the side surfaces 62 or 64 (e.g., surface 62 in FIGS. 13-15). The first portion 98 may also be radially disengaged from (e.g., spaced from) the other side surface 64 or 62 (e.g., surface 64 in FIGS. 13-15). The second portion 100 radially engages and may be radially biased against the other one of the side surfaces 64 or 62 (e.g., surface 64 in FIGS. 13-15). The second portion 100 may also be radially disengaged from (e.g., spaced from) the other side surface 62 or 64 (e.g., surface 62 in FIGS. 13-15). In the specific embodiment of FIG. 13, the first portion 98 (e.g., axially) overlaps/is bent back over and radially displaced from the second portion 100. In the specific embodiment of FIGS. 14 and 15, the first portion 98 is (e.g., axially) next to and radially displaced from the second portion 100. Thus, the second portion 100 is (e.g., axially) between the first portion 98 and the groove end surface 60A, 60B (generally referred to as "60"). In the specific embodiment of FIG. 15, the protrusion 76 further includes a third portion 102 that radially engages one of the side surfaces 62 or 64 (e.g., surface 62 in FIGS. 13-15). The third portion 102 may also be radially disengaged from (e.g., spaced from) the other side surface 64 or 62 (e.g., surface 64 in FIGS. 13-15). In this embodiment, the second portion 100 is (e.g., axially) next to and between as well as radially displaced from both the first portion 98 and the third portion 102. Thus, the third portion 102 is (e.g., axially) between the second portion 100 and the groove end surface 60.

By engaging both the side surfaces 62 and 64 with the projection 66A, 66B (generally referred to as "66") (e.g., with each protrusion 76), the projection 66 is configured to prevent or reduce rattling of the turbine engine component 34 during operation. Furthermore, while the projection 66 may be radially biased against both side surfaces 62 and 64, the projection 66 in general may be configured to bias the turbine engine component 34 radially against the support structure 32. This may prevent rattling of the turbine engine component 34 against the support structure 32. The radial bias may also maintain a seal, for example, between the turbine engine component 34 and the support structure 32.

In addition to the foregoing, the first and the second connections 36A and 36B may accommodate (e.g., thermally induced) movement between the turbine engine component 34 and components connected thereto. The spring/resilient compliance of the protrusions 76, for example, may enable differential thermal expansion between the protrusions 76 as well as the support structure 32 and the turbine engine component 34; thus, radial movement. The interlocking joint connections 36A and 36B may enable axial (e.g., thermally induced) movement between the components 32 and/or 76 and the turbine engine component 34; e.g., the protrusions 76 may slide within the grooves 50.

Figure 16:
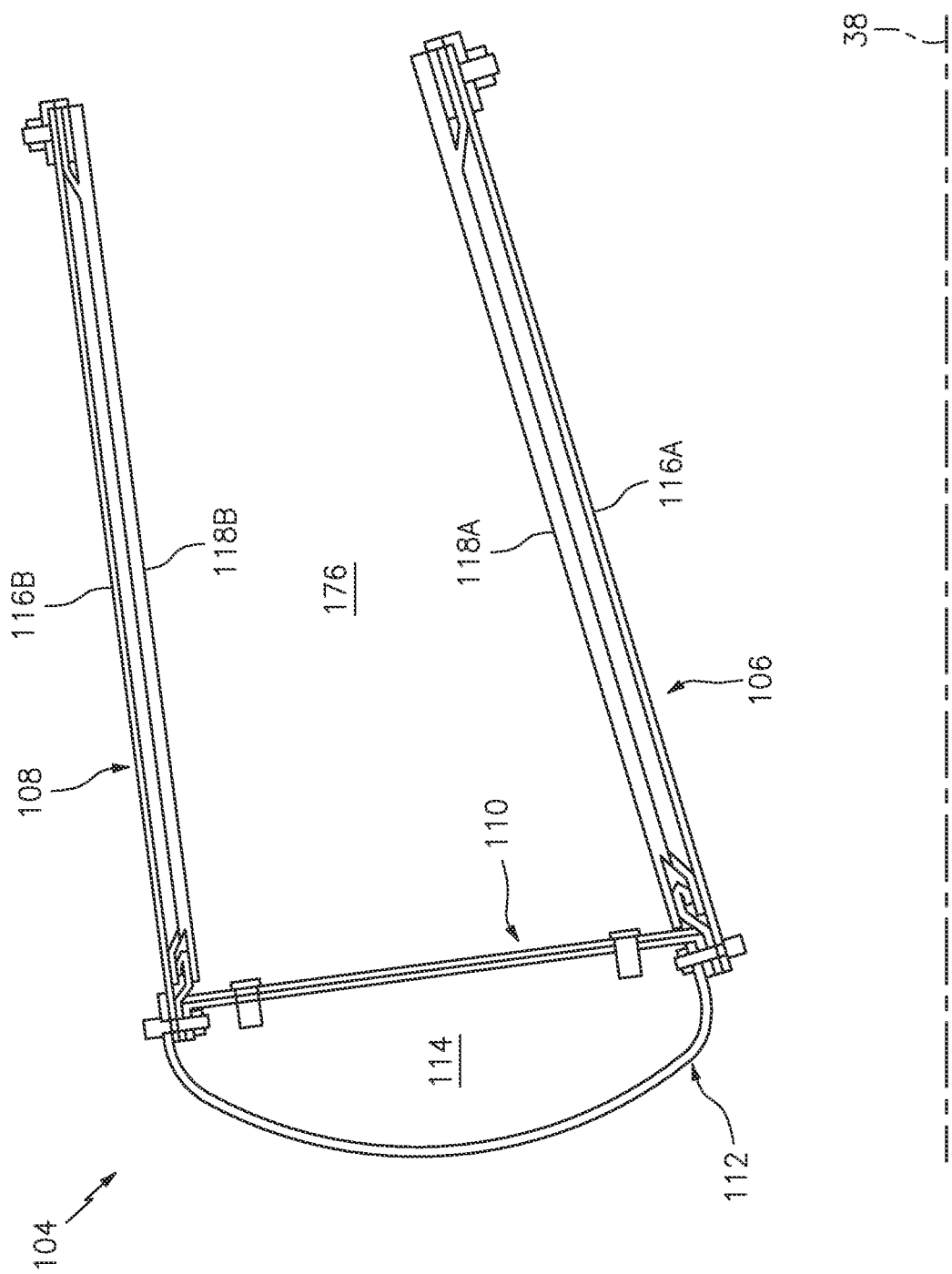
FIG. 16 is a partial side sectional illustration of a combustor.

FIG. 16 illustrates a combustor 104 for the gas turbine engine. This combustor 104 includes an inner combustor wall 106, an outer combustor wall 108, a combustor bulkhead 110 and a combustor hood 112. The combustor 104 may be configured as an annular combustor. Each of the inner and outer combustor walls 106 and 108, for example, may be a tubular wall that extends circumferentially around the centerline 38. The combustor bulkhead 110 may be an annular wall that extends circumferentially around the centerline 38 and radially from the inner combustor wall 106 to the outer combustor wall 108. The combustor hood 112 may also be an annular wall connected to the inner and the outer combustor walls 106 and 108. In the specific embodiment of FIG. 16, the combustor hood 112 has an arcuate (e.g., semi-circular) sectional geometry, which provides an annular plenum 114 axially between the hood 112 and the bulkhead 110.

Each of the combustor walls 106 and 108 may include a tubular support shell 116A, 116B (generally referred to as "116") and a tubular heat shield 118A, 118B (generally referred to as "118"). The heat shield 118 may be connected to the support shell 116 using connections as described above. For example, referring to FIG. 1, the support shell 116 may be configured as or otherwise include the support structure 32 and the heat shield 118 may be configured as or otherwise include the turbine engine component 34.

Figure 17:
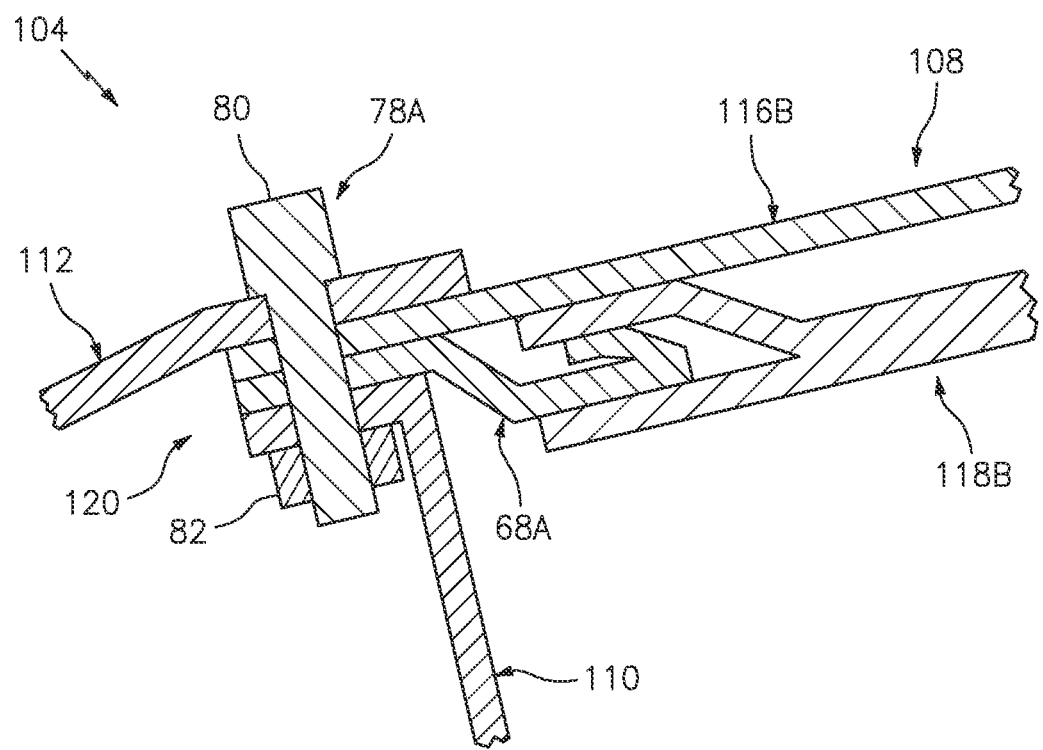
FIG. 17 is a partial side sectional illustration of an outer joint between components of the combustor.

Referring to FIG. 17, the outer combustor wall 108 is connected to the bulkhead 110 and the hood 112 at an outer joint. At this outer joint, the hood 112, the support shell 116, the first component mount 68A (e.g., its mount base) and the bulkhead 110 are arranged (e.g., sequentially) in a first stack 120. Each of the fasteners 78A may project through this first stack 120 to thereby secure the components 112, 116B, 68A and 110 together. Of course, in other embodiments, the components 112, 116B, 68A and 110 may be arranged in other orders within the first stack 120.

Figure 18:
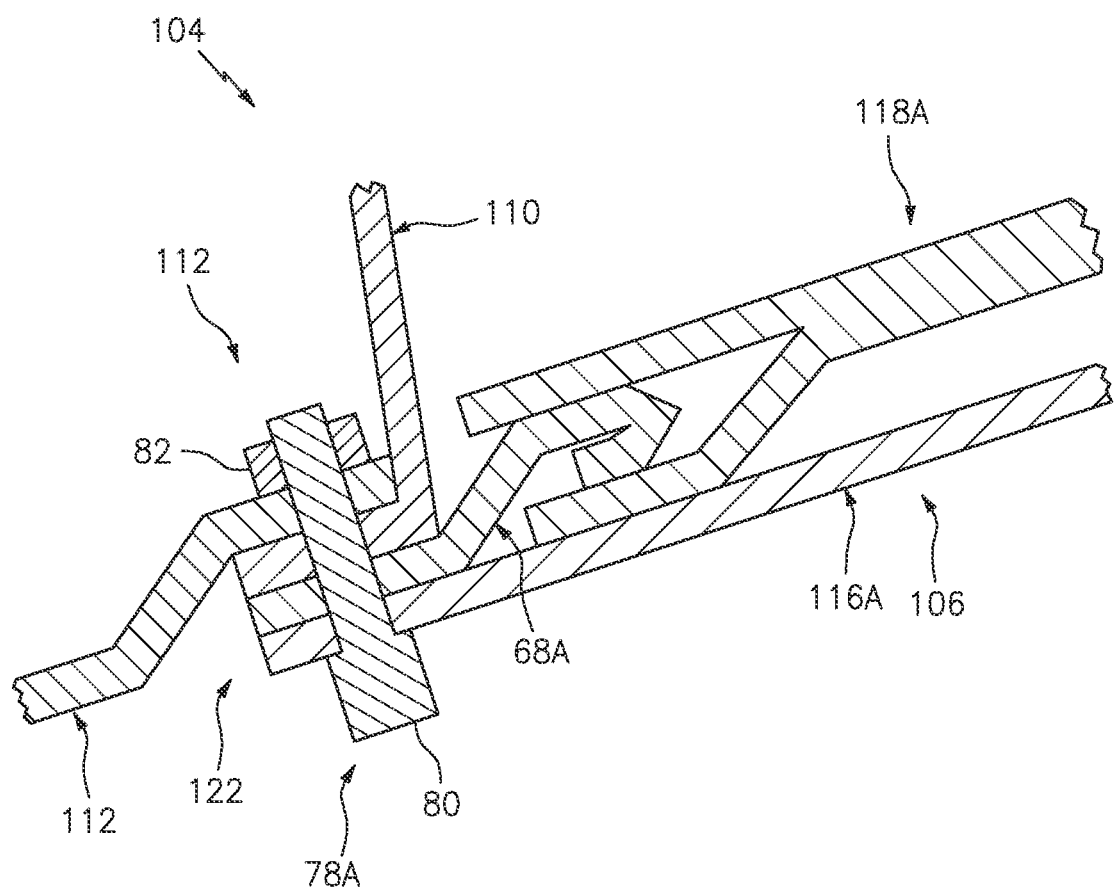
FIGS. 18 and 19 are partial side sectional illustrations of inner joints between components of the combustor.
Figure 19:
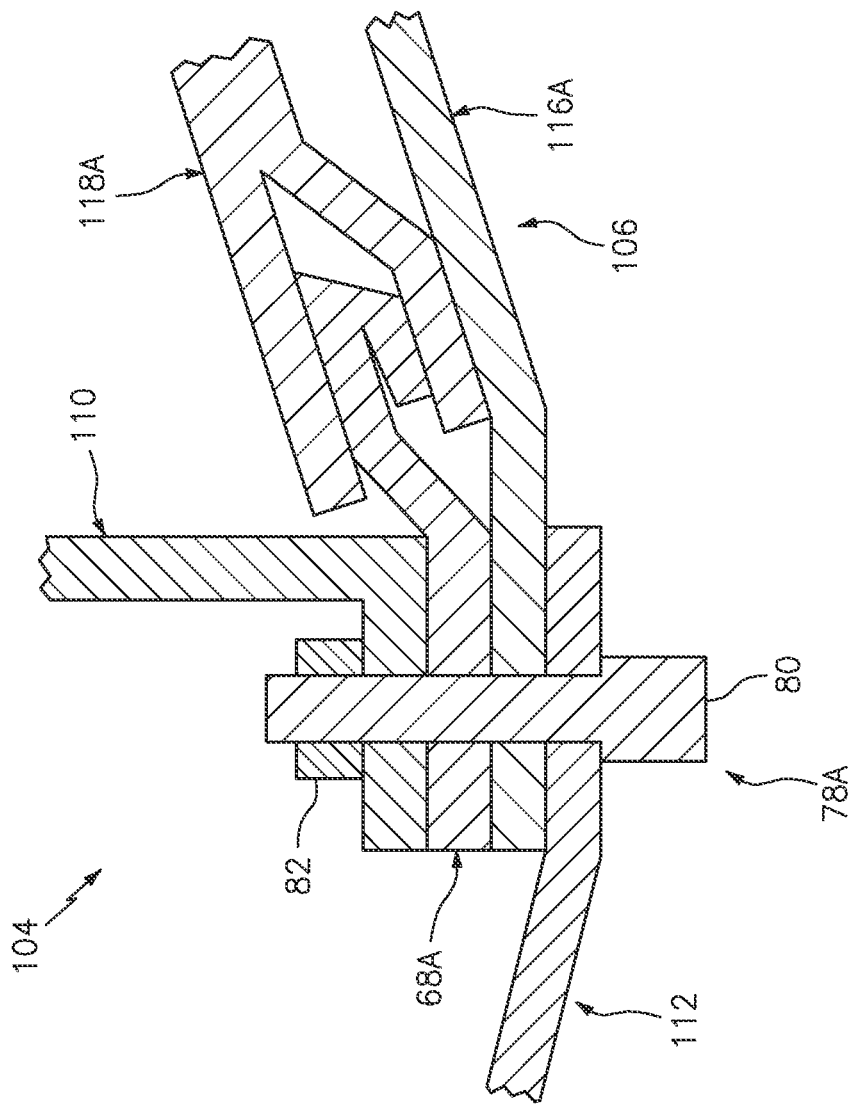

Referring to FIG. 18, the inner combustor wall 106 is connected to the bulkhead 110 and the hood 112 at an inner joint. At this inner joint, the hood 112, the bulkhead 110, the first component mount 68A (e.g., its mount base) and the support shell 116A are arranged (e.g., sequentially) in a second stack 122. Each of the fasteners 78A may project through this second stack 122 to thereby secure the components 112, 110, 68A and 116A together. Of course, in other embodiments, the components 112, 110, 68A and 116A may be arranged in other orders within the second stack 122. For example, referring to FIG. 19, the bulkhead 110, the first component mount 68A, the support shell 116A and the hood 112 may be arranged (e.g., sequentially) in the second stack 122 at the inner joint.

Figure 20:
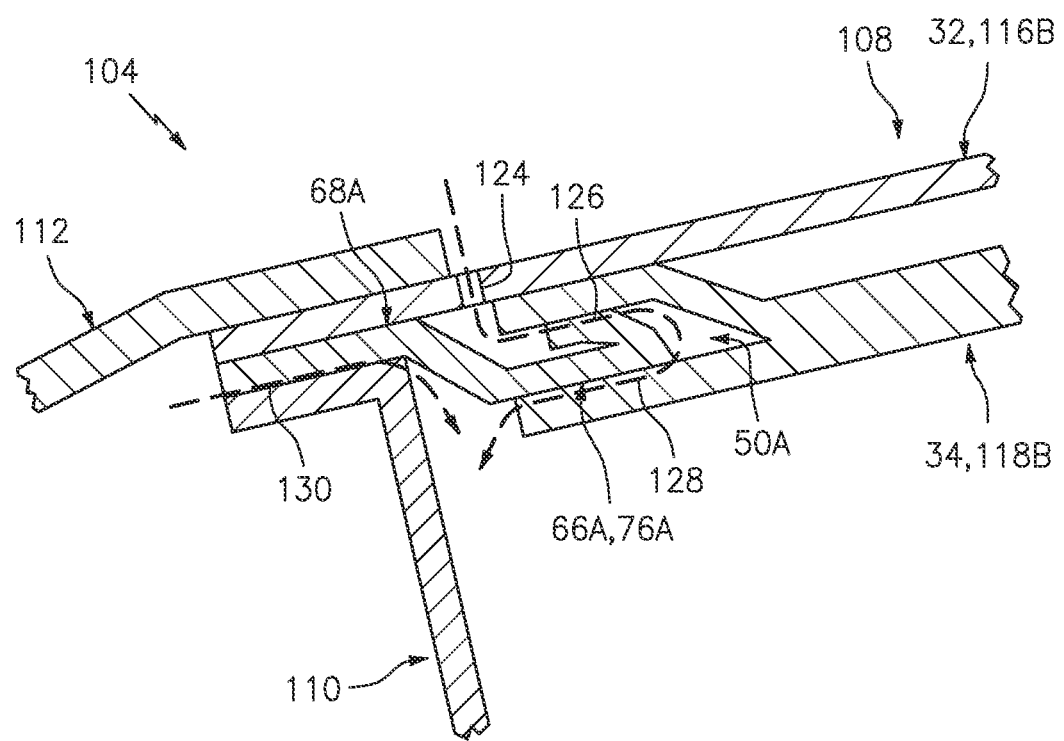
FIGS. 20 and 21 are partial side sectional illustration of joints between components of the combustor with cooling air passages.
Figure 21:
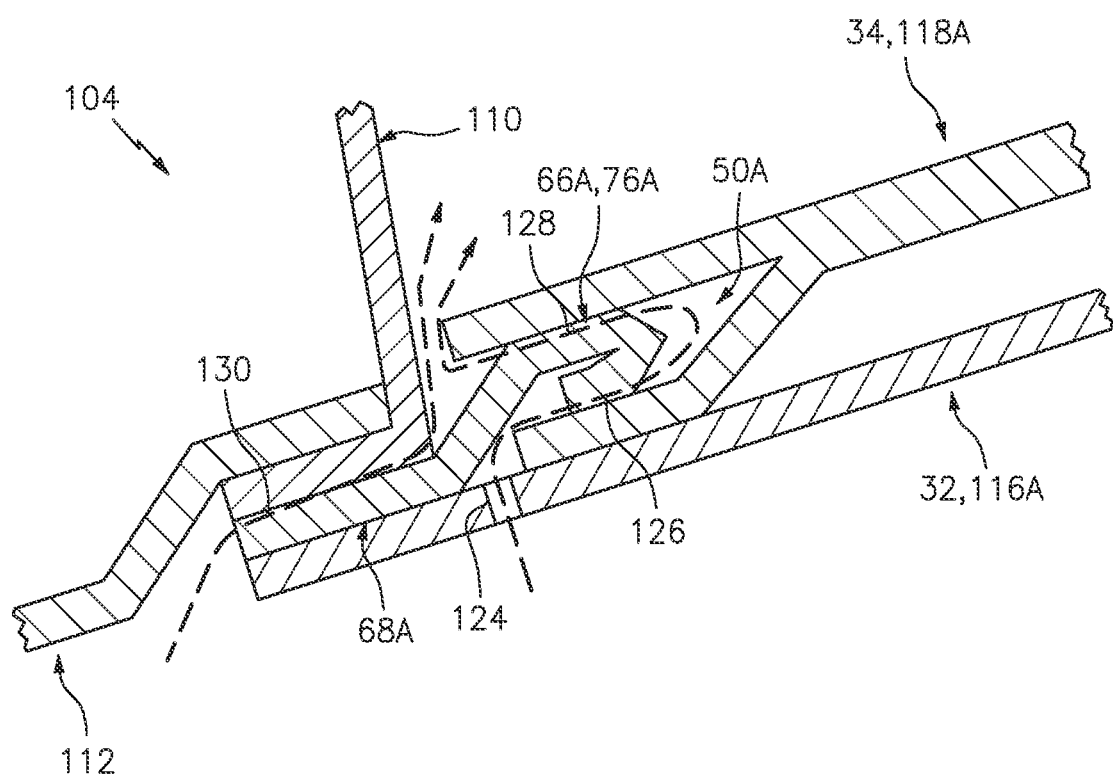

In some embodiments, referring to FIGS. 20 and 21, the combustor 104 is configured to direct cooling air to a portion of the projection 66A within the groove 50A. For example, the support shell 116A, 116B may include one or more apertures 124 (e.g., impingement apertures), which are fluidly coupled with one or more passages 126 and 128 around the protrusions 76A. One or more additional passages 130 may also direct cooling air between the bulkhead 110 and the first component mount 68A. These passages 126, 128 and/or 130 may be formed by one or more grooves in the first component mount 68A and/or one or more grooves in the adjacent components 110, 118A and 118B.

Figure 22:
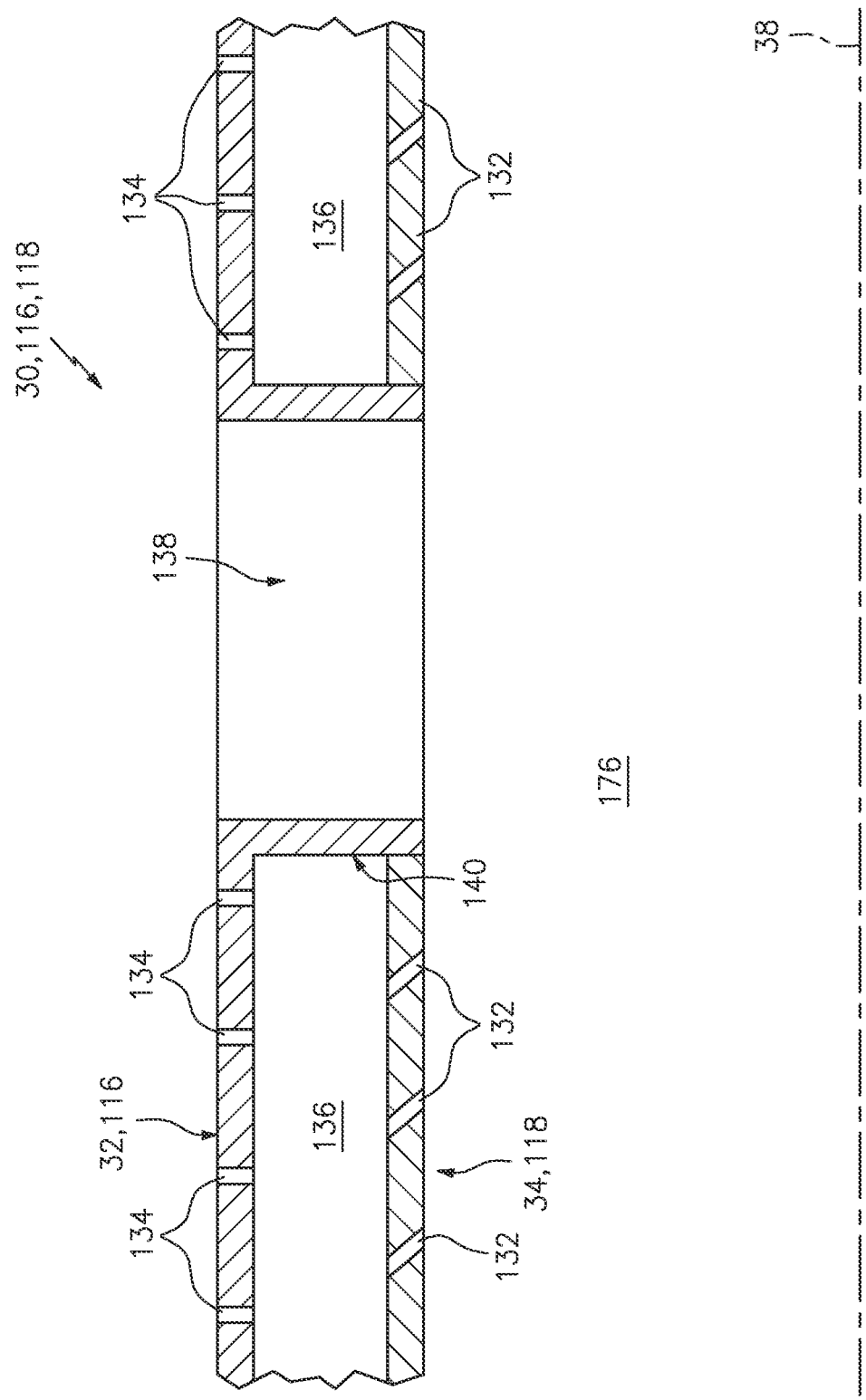
FIG. 22 is a partial side sectional illustration of a combustor wall of the combustor.

In some embodiments, referring to FIG. 22, the turbine engine component 34 (e.g., the heat shield 118) may be configured with one or more apertures 132; e.g., effusion apertures. The support structure 32 (e.g., the support shell 116) may also or alternatively be configured with one or more apertures 134; e.g., impingement apertures. A cooling cavity 136 formed by and extends radially between the turbine engine component 34 and the support structure 32 may fluidly couple one or more of the apertures 132 with one or more of the apertures 134.

In some embodiments, the combustor wall 106, 108 may be configured with one or more quench or dilution apertures 138. Each of these quench or dilution apertures 138 may be formed at least in part by a tubular body 140 (e.g., a grommet) and extends radially through the turbine engine component 34 (e.g., the heat shield 118) and the support structure 32 (e.g., the support shell 116).

In some embodiments, one or more or each tubular body 140 may be configured as a locating feature. Each locating feature may laterally (e.g., circumferentially and/or axially) locate the turbine engine component 34 (e.g., the heat shield 118) relative to the support structure 32 (e.g., the support shell 116). For example, by projecting into a respective aperture in the turbine engine component 34, the tubular body 140 (e.g., locating feature) of FIG. 22 may function as a stop that prevents (or substantially reduces) lateral movement of the turbine engine component 34 relative to the support structure 32 at a lateral point of the tubular body 140. By contrast, the connections 36A and 36B (see FIG. 1) may enable lateral shifting between the components 32 and 34 to accommodate different rates of thermal growth and/or contraction between the components 32 and 34.

Figure 23:
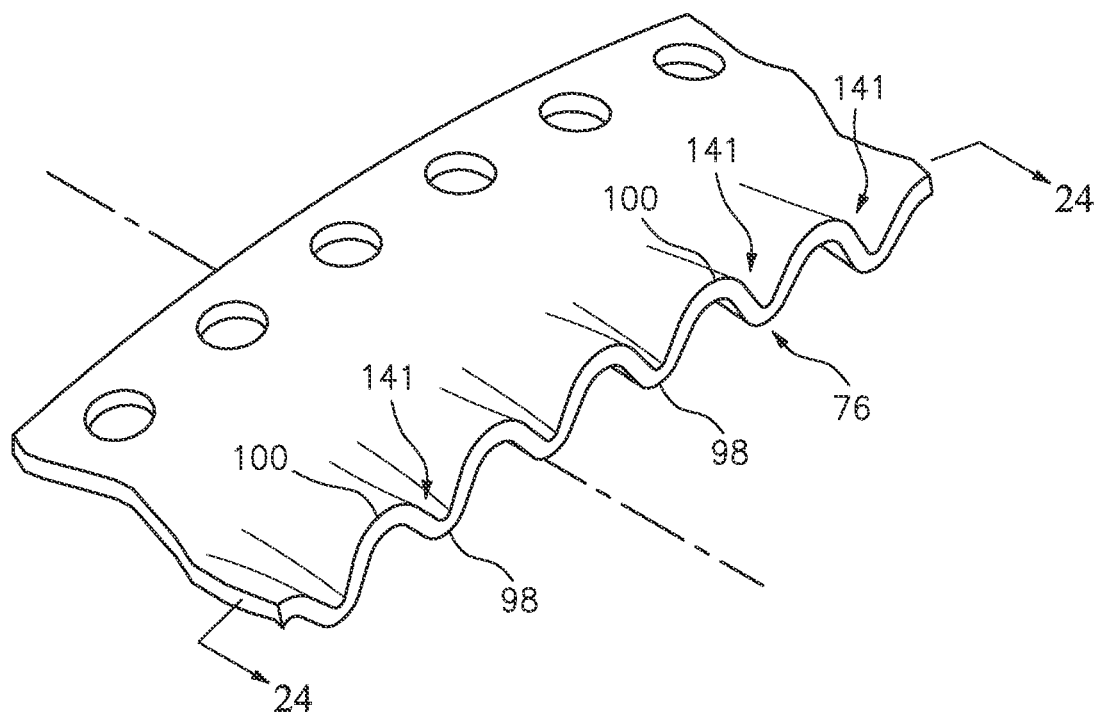
FIG. 23 is a perspective illustration of a circumferential segment of another component mount.
Figure 24:
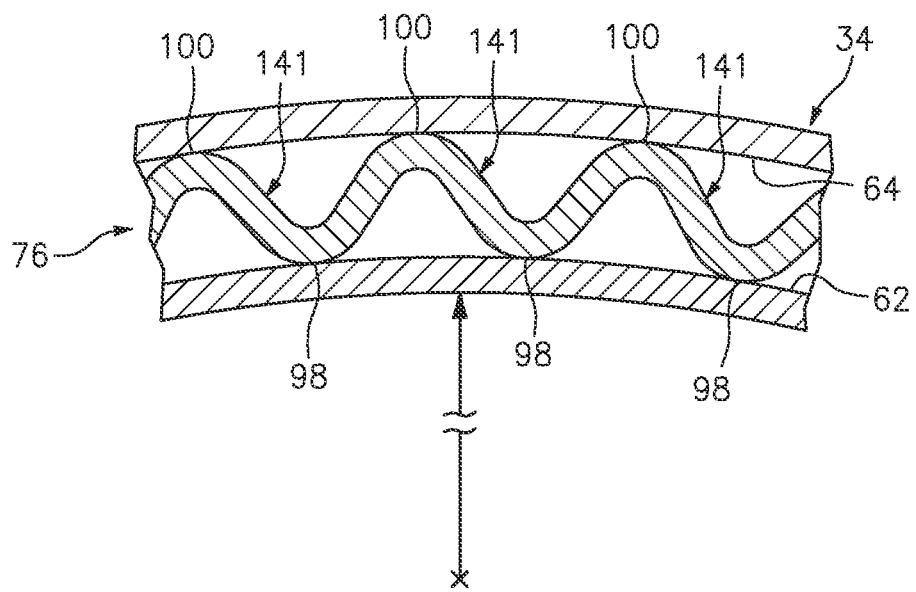
FIG. 24 is a sectional illustration of the component mount of FIG. 23, taken along line 24-24 in FIG. 23, arranged within a groove of a turbine engine component.

As described above with reference to FIGS. 13-15, at least the first portion 98 is engaged with one of the side surfaces 62 or 64 (e.g., surface 62 in FIGS. 13-15) and may be disengaged with the other one of the side surfaces 64 or 62 (e.g., surface 64 in FIGS. 13-15). Similarly, the second portion 100 is engaged with one of the side surfaces 64 or 62 (e.g., surface 64 in FIGS. 13-15) and may be disengaged with the other one of the side surfaces 62 or 64 (e.g., surface 62 in FIGS. 13-15). In the embodiments of FIG. 13, the first portion 98 and the second portion 100 are circumferentially and axially aligned relative to the centerline 38 (e.g., centerline shown in FIGS. 1 and 7). In the embodiment of FIG. 14, the first portion 98 and the second portion 100 are circumferentially aligned, but may be axially offset, relative to the centerline 38 (e.g., centerline shown in FIGS. 1 and 7). Referring to FIGS. 23 and 24, in still other embodiments, the first portion 98 and the second portion 100 are axially aligned, but may be circumferentially offset, relative to the centerline 38.

In the embodiment of FIGS. 23 and 24, the projection 66 is configured as a (e.g., annular or arcuate) corrugated body; e.g., an unsegmented corrugated body. Corrugations 141 of the projection 66 may be formed integral with one another as shown in FIGS. 23 and 24; e.g., each corrugation 141 is continuous with (e.g., not discrete from) adjacent corrugation(s) 141. Thus, the corrugations 141 may be provided instead of the protrusions 76 described above. Of course, in still other embodiments, the corrugated body may be a segmented body may up from a plurality of protrusions; e.g., circumferentially adjacent corrugations 141 may be (e.g., circumferentially) separated by a respective slit to provide the protrusions.

Figure 25:
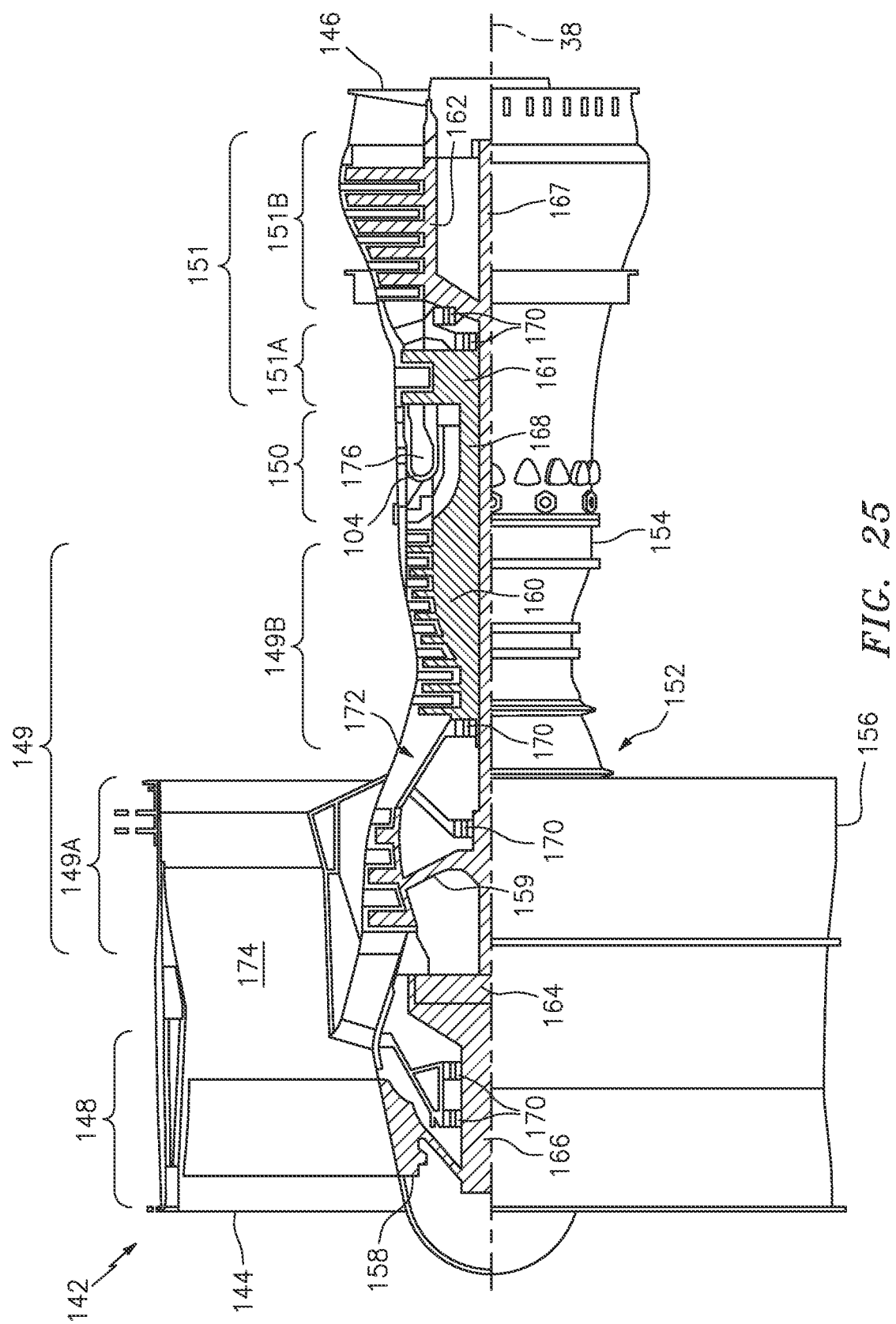
FIG. 25 is a side cutaway illustration of a geared turbine engine.

FIG. 25 is a side cutaway illustration of a geared turbine engine 142 with which the turbine engine assembly 30/the combustor 104 may be included. This turbine engine 142 extends along the centerline 38 between an upstream airflow inlet 144 and a downstream airflow exhaust 146. The turbine engine 142 includes a fan section 148, a compressor section 149, a combustor section 150 and a turbine section 151. The compressor section 149 includes a low pressure compressor (LPC) section 149A and a high pressure compressor (HPC) section 149B. The turbine section 151 includes a high pressure turbine (HPT) section 151A and a low pressure turbine (LPT) section 151B.

The engine sections 148-151B are arranged sequentially along the centerline 38 within an engine housing 152. This housing 152 includes an inner case 154 (e.g., a core case) and an outer case 156 (e.g., a fan case). The inner case 154 may house one or more of the engine sections 149A-151B; e.g., an engine core. The outer case 156 may house at least the fan section 148.

Each of the engine sections 148, 149A, 149B, 151A and 151B includes a respective rotor 158-162. Each of these rotors 158-162 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 158 is connected to a gear train 164, for example, through a fan shaft 166. The gear train 164 and the LPC rotor 159 are connected to and driven by the LPT rotor 162 through a low speed shaft 167. The HPC rotor 160 is connected to and driven by the HPT rotor 161 through a high speed shaft 168. The shafts 166-168 are rotatably supported by a plurality of bearings 170; e.g., rolling element and/or thrust bearings. Each of these bearings 170 is connected to the engine housing 152 by at least one stationary structure such as, for example, an annular support strut.

During operation, air enters the turbine engine 142 through the airflow inlet 144. This air is directed through the fan section 148 and into a core gas path 172 and a bypass gas path 174. The core gas path 172 extends sequentially through the engine sections 149A-151B. The air within the core gas path 172 may be referred to as "core air". The bypass gas path 174 extends through a bypass duct, which bypasses the engine core. The air within the bypass gas path 174 may be referred to as "bypass air".

The core air is compressed by the compressor rotors 159 and 160 and directed into a combustion chamber 176 of the combustor 104 in the combustor section 150. Fuel is injected into the combustion chamber 176 and mixed with the compressed core air to provide a fuel-air mixture. This fuel air mixture is ignited and combustion products thereof flow through and sequentially cause the turbine rotors 161 and 162 to rotate. The rotation of the turbine rotors 161 and 162 respectively drive rotation of the compressor rotors 160 and 159 and, thus, compression of the air received from a core airflow inlet. The rotation of the turbine rotor 162 also drives rotation of the fan rotor 158, which propels bypass air through and out of the bypass gas path 174. The propulsion of the bypass air may account for a majority of thrust generated by the turbine engine 142, e.g., more than seventy-five percent (75%) of engine thrust. The turbine engine 142 of the present disclosure, however, is not limited to the foregoing exemplary thrust ratio.

The turbine engine assembly 30/combustor 104 may be included in various turbine engines other than the one described above. The turbine engine assembly 30/combustor 104, for example, may be included in a geared turbine engine where a gear train connects one or more shafts to one or more rotors in a fan section, a compressor section and/or any other engine section. Alternatively, the turbine engine assembly 30/combustor 104 may be included in a turbine engine configured without a gear train. The turbine engine assembly 30/combustor 104 may be included in a geared or non-geared turbine engine configured with a single spool, with two spools (e.g., see FIG. 25), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A combustor with a centerline, comprising:
a support structure;
a heat shield extending circumferentially about and axially along the centerline, the heat shield comprising ceramic material, and the heat shield mounted to the support structure by an interlocking joint connection;
the interlocking joint connection comprising a flange and a groove, the flange configured with the support structure and projecting axially along the centerline into the groove, and the groove formed in the heat shield radially between a groove first side surface and a groove second side surface; and
a heat shield mount including the flange and a mount base, the heat shield mount configured with a mount groove extending radially between the flange and the mount base, the support structure and the heat shield projecting axially into the mount groove, and the heat shield mount attached to the support structure by a fastener extending radially through a slot formed in the mount base.

2. The combustor of claim 1, wherein the heat shield is configured with a forked end which forms the groove.

3. The combustor of claim 1, wherein the flange is configured to slide axially within the groove during combustor operation.

4. A combustor with a centerline, comprising:
a support structure;
a heat shield extending circumferentially about and axially along the centerline, the heat shield comprising ceramic material, and the heat shield mounted to the support structure by an interlocking joint connection;

the interlocking joint connection comprising a flange and a groove, the flange configured with the support structure and projecting axially along the centerline into the groove, and the groove formed in the heat shield radially between a groove first side surface and a groove second side surface;

wherein the flange comprises a first portion and a second portion;

wherein the first portion radially engages the groove first side surface and is radially disengaged from the groove second side surface; and wherein the second portion radially engages the groove second side surface and is radially disengaged from the groove first side surface.

5. The combustor of claim 4, wherein
the first portion is biased radially against the groove first side surface; and
the second portion is biased radially against the groove second side surface.

6. The combustor of claim 4, wherein the first portion overlaps the second portion.

7. The combustor of claim 4, wherein
a groove end surface extends radially between the groove first side surface and the groove second side surface; and
the second portion is between the first portion and the groove end surface.

8. The combustor of claim 4, wherein the flange further comprises a third portion that radially engages the groove first side surface or the groove second side surface.

9. The combustor of claim 1, wherein the combustor is configured to direct cooling air to a portion of the flange within the groove.

10. The combustor of claim 1, wherein the flange comprises metal.

11. The combustor of claim 1, further comprising:
a heat shield mount including the flange;
the heat shield mount configured as a monolithic full hoop body.

12. A combustor with a centerline, comprising:
a support structure;
a heat shield extending circumferentially about and axially along the centerline, the heat shield comprising ceramic material, and the heat shield mounted to the support structure by an interlocking joint connection;
the interlocking joint connection comprising a flange and a groove, the flange configured with the support structure and projecting axially along the centerline into the groove, and the groove formed in the heat shield radially between a groove first side surface and a groove second side surface;
a heat shield mount including the flange and a mount base, the flange projecting axially out from the mount base and into the groove;
a combustor bulkhead; and
a combustor hood;
the combustor hood, the combustor bulkhead, the heat shield mount and the support structure arranged together in a stack and connected together by a fastener that projects radially through the stack.

13. The combustor of claim 1, wherein
the heat shield extends axially along the centerline between an upstream end and a downstream end; and
the interlocking joint connection is located at the downstream end.

14. The combustor of claim 1, further comprising a locating feature configured to circumferentially and/or axially locate the heat shield relative to the support structure, the locating feature comprising a tubular body that forms a quench aperture.

15. An assembly for a gas turbine engine, comprising:
a support structure; and
a turbine engine component extending circumferentially about and axially along a centerline, the turbine engine component comprising ceramic matrix composite material, and the turbine engine component mounted to the support structure by a connection;
the connection comprising a plurality of protrusions and a groove, the plurality of protrusions arranged circumferentially about the centerline and extending axially along the centerline into the groove, each of the plurality of protrusions circumferentially separated from a respective circumferentially neighboring one of the plurality of protrusions by a slot, and the groove formed within the turbine engine component at an axial end of the turbine engine component radially between a groove first side surface of the turbine engine component and a groove second side surface of the turbine engine component; and
a first of the plurality of protrusions fixedly secured to the support structure, and the first of the plurality of protrusions slidable within the groove axially along the centerline.

16. The assembly of claim 15, wherein the first of the plurality of protrusions contacts and is biased radially against at least one of the groove first side surface or the groove second side surface.

17. The combustor of claim 4, wherein
the flange includes a plurality of fingers; and
a first of the plurality of fingers includes the first portion and the second portion.

* * * * *